United States Patent [19]

Shimada et al.

[11] Patent Number: 4,757,191
[45] Date of Patent: Jul. 12, 1988

[54] UNIFORM INTENSITY PER PIXEL WHEN THE LINEAR SPEED OF A LASER BEAM VARIES ALONG A SCANLINE

[75] Inventors: Kazuyuki Shimada, Tokyo; Susumu Imakawa, Kanagawa, both of Japan

[73] Assignee: Ricoh Company, Ltd., Tokyo, Japan

[21] Appl. No.: 892,147

[22] Filed: Jul. 30, 1986

[30] Foreign Application Priority Data

Jul. 31, 1985 [JP] Japan ................................. 60-169341
Aug. 5, 1985 [JP] Japan ................................. 60-172155
Aug. 5, 1985 [JP] Japan ................................. 60-172156

[51] Int. Cl.$^4$ ............................................. G01J 1/32
[52] U.S. Cl. ..................................... 250/205; 250/235
[58] Field of Search ............................... 250/234–236, 250/205; 350/6.1, 6.5–6.91; 358/285, 292–294

[56] References Cited

U.S. PATENT DOCUMENTS

| 4,204,233 | 5/1980 | Swager ................................. 358/293 |
| 4,270,131 | 5/1981 | Tompkins et al. .................... 350/6.8 |
| 4,443,695 | 4/1984 | Kitamura ............................. 250/205 |
| 4,518,998 | 5/1985 | Warner ................................. 250/235 |
| 4,622,593 | 11/1986 | Curry .................................. 250/235 |

Primary Examiner—David C. Nelms
Assistant Examiner—Khaled Shami
Attorney, Agent, or Firm—Cooper & Dunham

[57] ABSTRACT

A modulated laser beam emitted from a semiconductor laser is deflected by a rotating light beam deflector to scan a desired surface. The frequency of an image scanning clock signal and the intensity of the laser beam from the semiconductor laser are varied according to a scanning rate at which the surface is scanned by the modulated laser beam.

8 Claims, 7 Drawing Sheets

F I G. 2
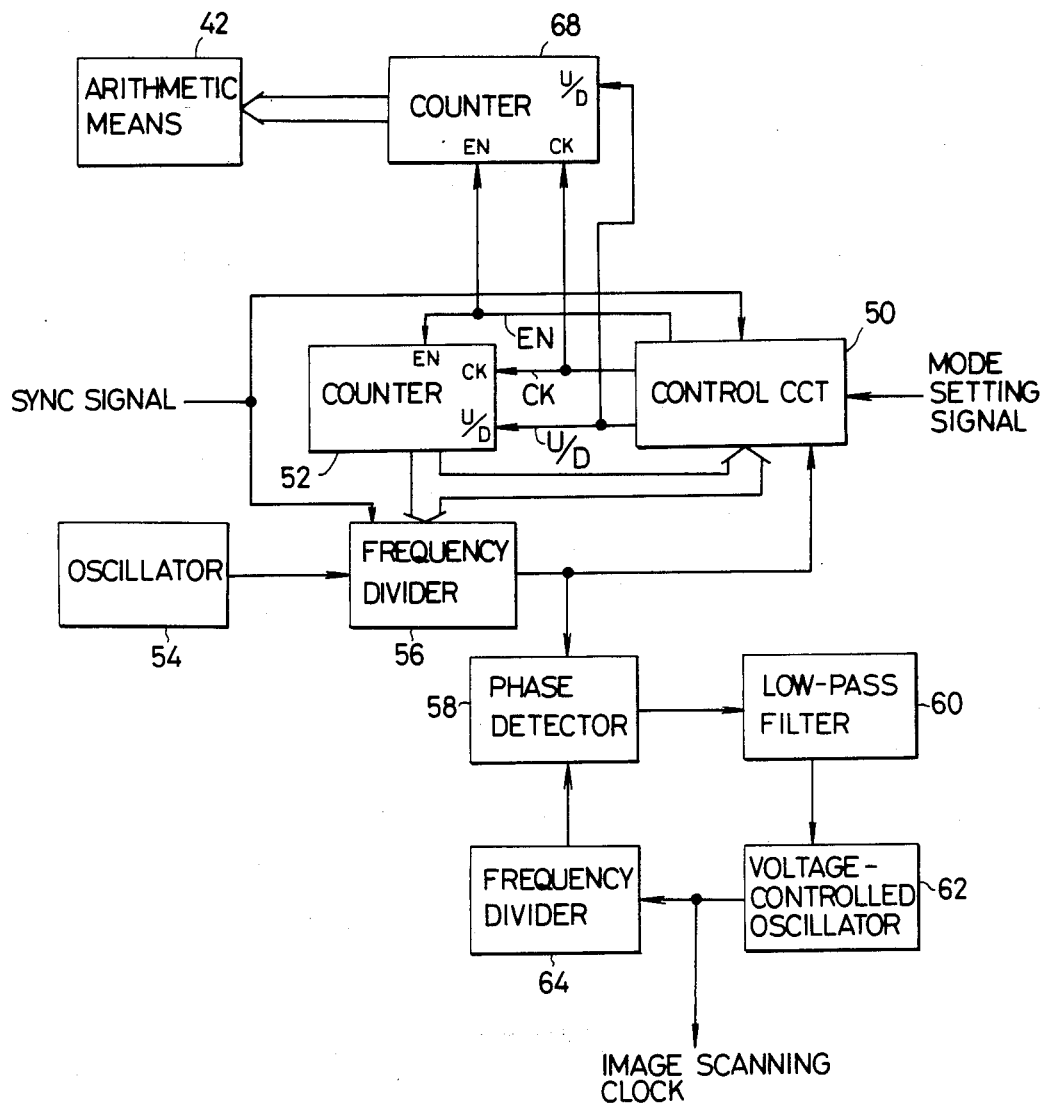

F I G. 8
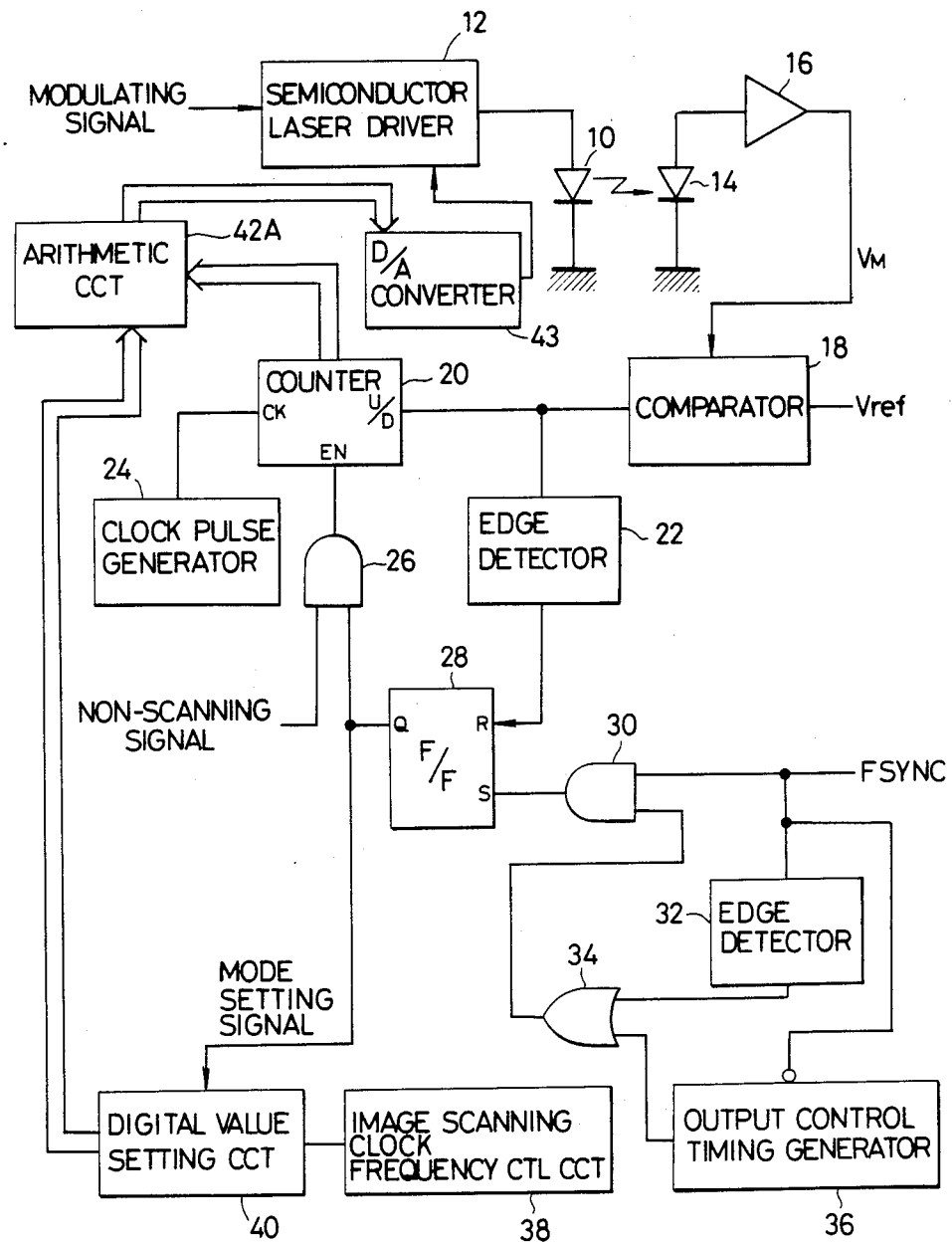

UNIFORM INTENSITY PER PIXEL WHEN THE LINEAR SPEED OF A LASER BEAM VARIES ALONG A SCANLINE

BACKGROUND OF THE INVENTION

1. Field of the Invention

The present invention relates to an optical scanning method.

2. Description of the Prior Art

Optical scanning methods in which a modulated laser beam from a semiconductor laser is deflected by a rotating light beam deflector such as a rotating polygonal mirror or a hologram scanner are well known in the art. The laser beam is deflected by the rotating light beam deflector at a constant angular velocity to scan a desired surface. To make the scanning speed or rate constant on the surface being scanned, an fθ lens is generally employed in the optical scanning methods. Since the fθ lens is expensive, however, there has been a demand for an optical scanning system which has no such fθ lens. There has recently been proposed a polygonal mirror which does not scan a light beam at a constant angular velocity (see Japanese Patent Application No. 59(1984)-274324). No fθ lens can be used with such a proposed polygonal mirror since any fθ lens would fail to make the scanning speed constant.

One optical scanning method of optically scanning a surface without the use of an fθ lens has recently been proposed. FIG. 6 of the accompanying drawings illustrates an optical scanner used to carry out such a proposed optical scanning method. A modulated laser beam emitted from a semiconductor laser is applied through a lens 80 to a rotating light beam deflector 82 in the form of a rotating polygonal mirror, and is reflected by one of the reflecting surfaces of the polygonal mirror 82 toward a cylindrical photoconductive photosensitive body 84 on which the laser beam is converged by the lens 80. When the polygonal mirror 82 is rotated at a constant speed about its own axis in the direction of the arrow, the laser beam reflected thereby is deflected from left to right (as shown) to scan the photosensitive body 84 along its generatrices. A light detector 86 is disposed adjacent to the photosensitive body 84 for synchronizing the points to start successive scanning cycles. Due to continued rotation of the polygonal mirror 82, the laser beam is reflected by the successive reflecting surfaces of the mirror 82 to cyclically deflect or scan the laser beam.

Assuming that a time slot required to write information of one pixel during optical scanning is T, a clock signal having a frequency fk expressed as 1/T is referred to as an image scanning clock signal. Desired information is written, one pixel by one pixel, on the photosensitive body 84 by the image scanning clock signal.

In an optical scanning method in which no fθ lens is employed, the speed at which a surface is scanned with a scanning light beam is not constant. Therefore, if the frequency fk of an image scanning clock signal were constant, the information written by the scanning light beam would be distorted. To prevent the information from being distorted, the frequency fk must be varied dependent on changes in the scanning rate at which the surface is scanned. More specifically, where the scanning rate is higher, the image scanning clock frequency fk should be increased, and where the scanning rate is lower, the image scanning clock frequency fk should be decreased.

By thus changing the image scanning clock frequency fk with the scanning rate, any distortion of the written information can effectively be reduced.

As described above, the frequency fk is a reciprocal of the time slot T that is allotted to the writing of information of one pixel. This means that when the frequency fk varies, the time slot T also varies. Insofar as the intensity of the scanning laser beam is constant, the optical energy used for writing one pixel in an area wherein the scanning rate is higher (the time slot T is shorter) is different from the optical energy used for writing one pixel in an area wherein the scanning rate is lower (the time slot T is longer). As a consequence, pixels on the photosensitive body 84 are exposed to varying amounts of light as the scanning rate changes when information is written on the photosensitive body by optical scanning, and hence the resultant information image is subject to varying image densities dependent on the changes in the scanning rate.

SUMMARY OF THE INVENTION

It is an object of the present invention to provide an optical scanning method capable of effectively reducing image density variations resulting from the correction of the frequency of an image scanning clock frequency.

According to the present invention, as shown in FIG. 6, a laser beam emitted from a semiconductor laser and modulated by a modulating signal according to an image signal is deflected by the rotating light beam deflector 82 comprising a rotating polygonal mirror or a hologram scanner to scan a surface on the photosensitive body 84 without using any fθ lens.

The intensity of the laser beam emitted from the semiconductor laser is highly unstable as it is temperature-dependent. To make the laser beam intensity stable, it is set to a reference level by an output intensity control circuit.

The laser beam intensity is set to a reference level during a period other than an optical scanning interval. It may be set to a reference level during a standby period prior to the starting of a scanning process for writing information on one page, or during a period other than an optical scanning interval while optical scanning is being carried out. The laser beam intensity may be set to a reference level once in several deflection cycles during a period other than an optical scanning interval.

The output intensity control circuit may comprise a circuit that has been proposed by the applicant in Japanese Patent Application No. 60(1985)-16010.

An image scanning clock signal is generated by an image scanning clock frequency control circuit, the image scanning clock signal having a frequency continuously variable dependent on changes in the scanning rate at which a surface is scanned.

The image scanning clock frequency control circuit may comprise a circuit which has been proposed by the applicant in Japanese Patent Application No. 60(1985)-92960.

When the intensity of the laser beam emitted from the semiconductor laser during an optical scanning period is set to a reference level, the output intensity control circuit generates a digital reference signal.

In the image scanning clock frequency control circuit, frequency-dividing ratios for frequency-dividing a reference clock signal from an oscillator are successively changed, and an image scanning clock signal of a continuously varying frequency is produced from a phase-locked loop circuit according to the successively changing frequency-dividing ratios. Each time the frequency-dividing ratio is changed from one to another, an up/down counter is driven to produce a digital correction signal.

The reference signal and the correction signal are applied respectively to two D/A converters, i.e., the digital reference signal is applied to one of the D/A converters, whereas the correction signal are applied to the other D/A converter.

An arithmetic means modulates the reference signal with the correction signal through any of addition, subtraction, multiplication, and division. From the arithmetic means, there is produced an analog signal which successively changes in a step-like manner in proportion to changes in the scanning rate. The output from the up/down counter and arithematic formulas in the arithmetic means are determined such that the step-like changes of the analog signal will well approximate suitable amounts of exposure dependent on variations in the frequency of the image scanning clock signal.

The analog signal is applied to energize the semiconductor laser while being modulated by the modulating signal. The amounts of exposure are varied, though in a step-like manner, so as to reduce exposure variations dependent on the scanning rate.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a block diagram of a circuit for generating a correction signal;

FIGS. 8 and 9 are block diagrams of circuit arrangements for carrying out the optical scanning method of the present invention.

DESCRIPTION OF THE PREFERRED EMBODIMENTS

Figure 1:
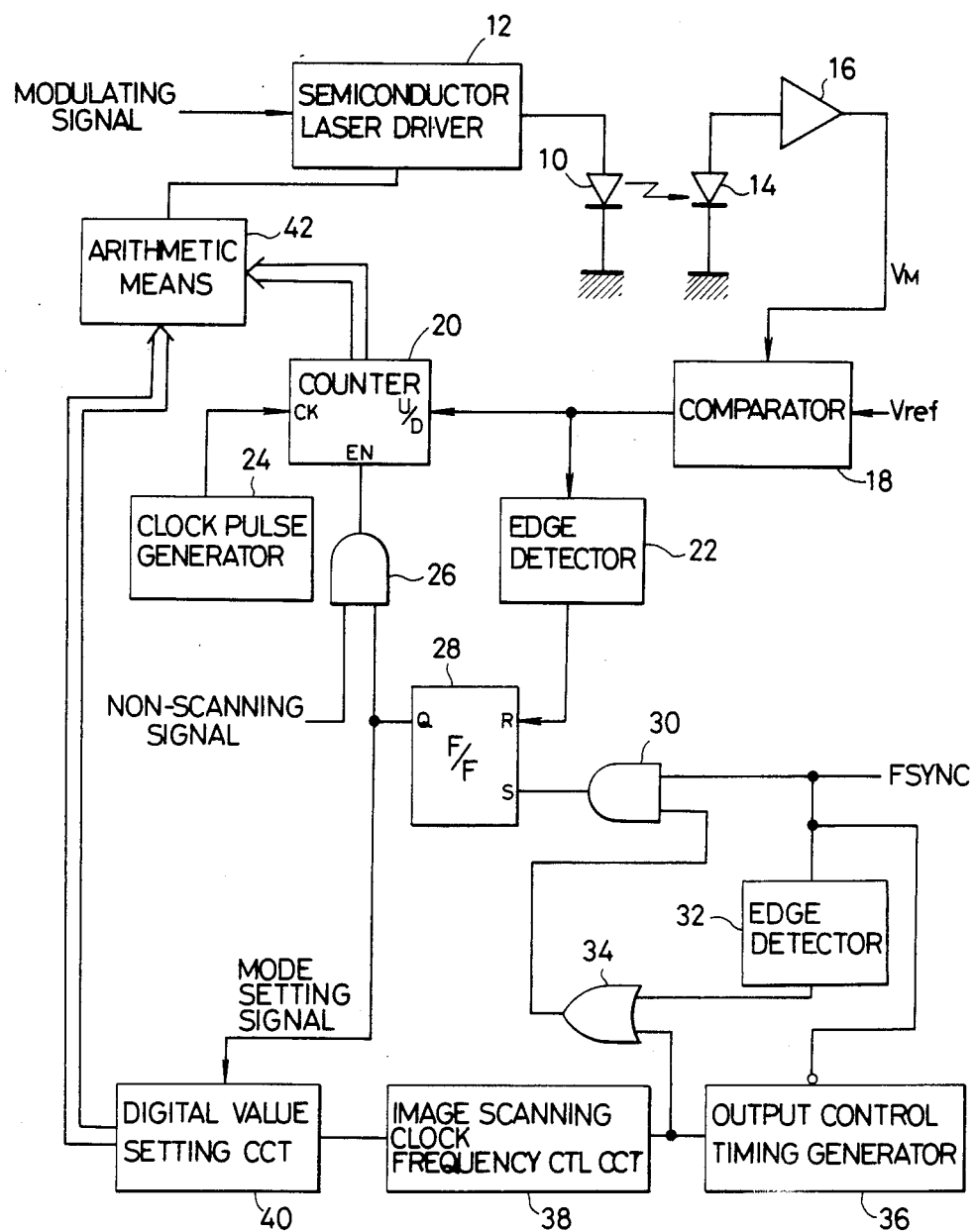
FIG. 1 is a block diagram of a circuit arrangement for carrying out an optical scanning method according to the present invention.

FIG. 1 shows a circuit arrangement for carrying out an optical scanning method according to the present invention. An image scanning clock frequency control circuit 38 and a digital value setting circuit 40 are the same as the output intensity control circuit proposed by the applicant in Japanese Patent Application No. 60(1985)-16010.

Setting the intensity of a laser beam emitted from a semiconductor laser and the generation of a reference signal will be described with reference to FIG. 1.

An arithmetic means 42 has two D/A converters, one for converting a reference signal and the other for converting a correction signal. The D/A converter for converting the correction signal is controlled such that it will not act on the output intensity control circuit at all when the leaser beam intensity is being set to a reference level (or during output intensity control). Therefore, during output intensity control, the arithmetic means 42 operates only as the D/A converter for converting the reference signal.

Figure 6:
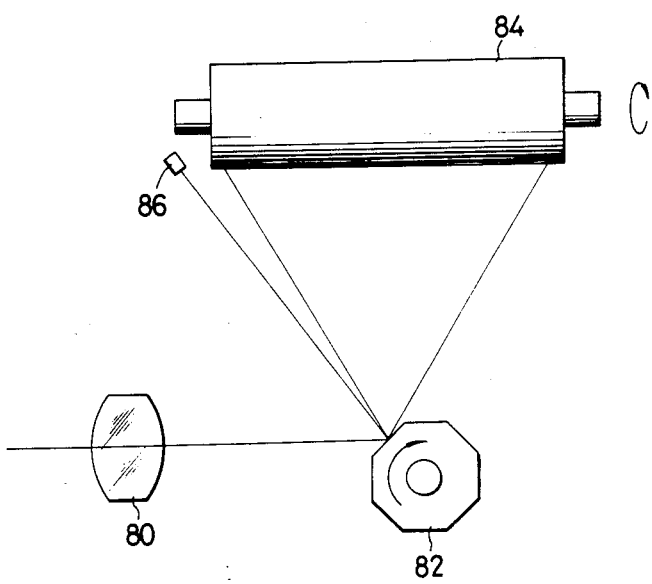
FIG. 6 is a schematic view of an optical scanning system for effecting the optical scanning method of the present invention.

A laser beam emitted backwards from a semiconductor laser 10 (i.e., in a direction opposite to or different from the direction of the laser beam which scans the scanning lines as on surface 84 in FIG. 6) is detected by a photosensor 14 which issues a current proportional to the intensity of the detected laser beam. The current from the photosensor 14 is converted by an amplifier 16 to a voltage which is applied as a voltage VM to a comparator 18, by which it is compared with a reference voltage Vref. An output voltage from the comparator 18 is of a high level or a low level dependent on the magnitudes of the voltages VM, Vref, for controlling the count mode an up/down counter 20. More specifically, when the output intensity of the semiconductor laser 10 does not reach the reference level, the output from the comparator 18 is of a low level to control the counter 20 to operate in an up-count mode as an up counter. When VM>Vref, the counter 20 operates in a down-count mode as a down counter.

An edge detector 32 detects a positive-going edge of a frame synchronizing signal FSYNC, and a detected signal from the edge detector 32 is applied via an OR gate 34 to an AND gate 30 which ANDs the detected signal and the frame synchronizing signal FSYNC.

A flip-flop 28 is set by an output from the AND gate 30 at the start of a standby mode to produce an output signal, which is applied to an AND gate 26 that ANDs this output signal and a non-scanning signal.

The counter 20 is enabled by an output signal from the AND gate 26 for counting up or down clock pulses generated by a clock pulse generator 24.

A count output from the counter 20 is converted by the arithmetic means 42 to an analog signal that is applied to a semiconductor laser driver 12. The semiconductor laser driver 12 drives the semiconductor laser 10 with a modulating signal which is varied dependent on the output signal from the arithmetic means 42.

As the count of the counter 20 is progressively increased (or reduced), the intensity of the laser beam from the semiconductor laser 10 is also progressively increased (or reduced) to progressively increase (or reduce) the voltage VM applied to the comparator 18.

When the voltage VM is changed to the extent that its magnitude relation to the reference voltage Vref is reversed, the output of the comparator 18 is changed from the low level to the high level (or from the high level to the low level). At this time, the edge detector 22 detects a positive-going edge (or a negative-going edge) of the output from the comparator 18 to reset the flip-flop 28, thus disabling the counter 20. Therefore, the counter 20 holds the count at the time the output of the comparator 18 is reversed, with the result that the magnitude of the current which drives the semiconductor laser 10 at this time is maintained. At this time, the voltage VM is virtually equal to the reference voltage Vref, and the output intensity of the semiconductor laser 10 is set to a reference level established according to the reference voltage Vref. With the output intensity of the semiconductor laser 10 being thus set to a reference level, the digital signal produced from the counter 20 is used as a reference signal.

The edge detector 22 may be arranged to disable the counter 20 only when the output of the comparator 18 changes from the low level to the high level. With such a modification, when the output of the comparator 18 changes from the low level to the high level, the entire circuit operates in the same manner as described above. However, when the output of the comparator 18 changes from the high level to the low level, the counter 20 remains enabled operates as an up counter. The current which drives the semiconductor laser 10 is increased, and when the output of the comparator 18 changes from the low level to the high level, the edge detector 21 detects a positive-going edge of the output of the comparator 18, thus disabling the counter 20 to hold its count.

The counter 20 may also be arranged such that it operates as a down counter when the output of the comparator 18 is of the low level, and as an up counter when the output of the comparator 18 is of the high level, with the count being in inverse proportion to the current which drives the semiconductor laser 10.

An output control timing generator 36 operates in a standby mode in response to the frame synchronizing signal FSYNC, and generates an output control timing signal at a constant period to set the power of the semiconductor laser 10 at such a constant period.

When a photosensitive body is scanned by the laser beam, the non-scanning signal is eliminated to turn off the AND gate 26, disabling the counter 20. The semiconductor laser 10 is not driven at the time of scanning in the standby mode of the laser. The setting of the power of the semiconductor laser 10, if not completed, is interrupted. At the time of non-scanning, the setting of the power of the semiconductor laser 10 is resumed. When the intensity of the laser beam from the semiconductor laser 10 is set to a reference level, the counter 20 produces a reference signal. This reference signal may change each time the power of the semiconductor laser is set, but remains unchanged once the power of the semiconductor laser is set.

The generation of the correction signal will now be described.

FIG. 2 shows a specific circuit arrangement of the image scanning clock frequency control circuit 38 and the digital value setting circuit 40.

Those circuits of FIG. 2 other than an up/down counter 68 and the arithmetic means 42 serve as the image scanning clock frequency control circuit, which is identical to that which has been proposed by the applicant in Japanese Patent Application No. 60(1985)-92960. The image scanning clock frequency control circuit includes a phase detector 58, a low-pass filter 60, a voltage-controlled oscillator 62, and a frequency divider 64 that jointly constitute a phase-locked loop (PLL) circuit.

Elements 50, 52, 54, 56 and 68 of FIG. 2 comprise the digital value setting circuit of FIG. 1.

The image scanning clock frequency control circuit will operate as follows: A reference clock signal of a frequency $f_0$ generated by an oscillator 54 is frequency-divided by a frequency divider 56 into a position control clock signal having a frequency of $f_0/N$, which is applied to a control circuit 50 and the phase detector 58.

The phase detector 58 compares the phases of the position control clock signal and a clock signal from the frequency divider 64, and applies the phase difference as a pulse signal to the low-pass filter 60. When the phase difference information is delivered through the low-pass filter 60 to the voltage-controlled oscillator 62, the oscillator 62 produces a clock signal having a frequency commensurate with the output voltage of the low-pass filter 60. The clock signal generated by the oscillator 62 serves as an image scanning clock signal. The image scanning clock signal is then frequency-divided by the frequency divider 64, which applies the clock signal to the phase detector 58 in which it is compared with the position control clock signal.

The frequency divider 64 has a fixed frequency-dividing ratio M. When the phase difference between the clock signal applied by the frequency divider 64 to the phase detector 58 and the position control clock signal having a frequency ($f_0/N$) is not varied, the frequency fk of the image scanning clock signal produced by the voltage-controlled oscillator 62 is expressed by $fk = f_0 \cdot (M/N)$.

By varying the frequency-dividing ratio of the frequency divider 56 from N to N1, the frequency of the position control clock signal becomes $f_0 \cdot (1/N1)$, and the frequency fk of the image scanning clock signal is changed successively at a constant rate from $f_0 \cdot (M/N)$ to $f_0 \cdot (M/N1)$.

Therefore, by successively varying the frequency-dividing ratio N of the frequency divider 56, the frequency of the image scanning clock signal can be successively changed.

The control circuit 50 produces a clock signal CK for enabling an up/down counter 52 to produce preset values for frequency-dividing ratios of the frequency divider 56, a signal EN for enabling the up/down counter 52, and a mode signal U/D for selecting an up-count or down-count mode.

The mode signal U/D is generated so that the U/D counter 52 changes from the up-count mode (or down-count mode) to the down-count mode (or up-count mode) in the vicinity of an extreme value of the scanning rate.

When the clock signal CK is applied to the counter 52, the counter 52 updates the preset value and changes the frequency-dividing ratio of the frequency divider 56 at a constant width N.

Figure 7:
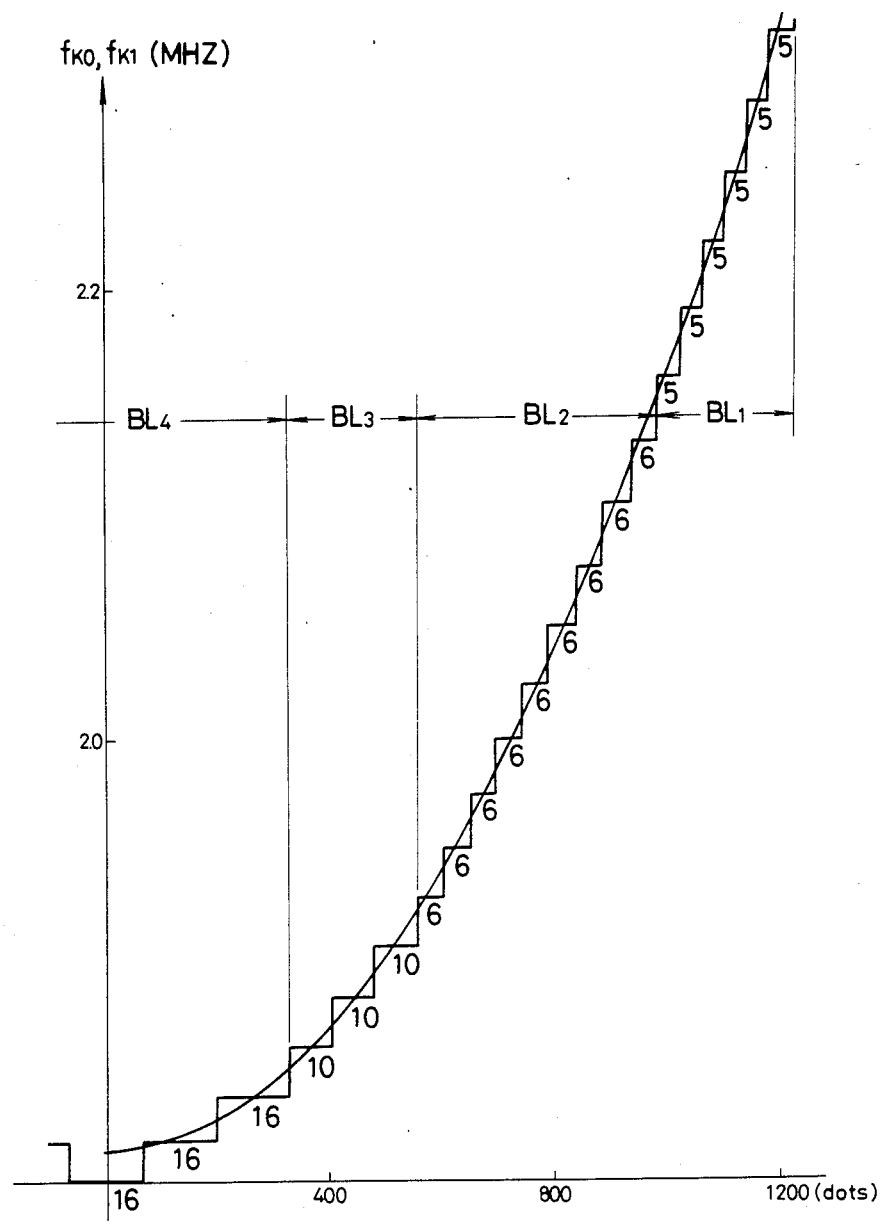
FIG. 7 is a graph showing the manner in which an image scanning clock frequency control circuit operates.

An area to be optically scanned is divided into a plurality of blocks BL1, BL2, ..., BLi, ..., BLK, and numerical values Mi, ni (i=1 through K) are determined for each block BLi (i=1 through K). As illustrated in FIG. 7, a scanning line is divided into blocks BL$_4$, BL$_3$, BL$_2$ and BL$_1$, where each block is a portion of the scanning line. In the general case, a scanning line is divided into K blocks, where K is a positive integer, so that the scanning line can be said to be divided into blocks BL$_1$ to BL$_K$, and the i-th block can be designated BL$_i$, where i is a positive integer ranging from 1 to K. Similarly, Ni represents the frequency dividing ratio N of the frequency divider 56 for the i-th block BL$_i$. Still similarly, Mi is the frequency dividing ratio M of the frequency divider 64 for the i-th block BL$_i$.

In the ith block BLi, the control circuit 50 generates the clock signal CK each time Mi pulses of the position control clock signal are applied to the control circuit 50, thereby changing the frequency-dividing ratio of the frequency divider 56 by $\Delta N$. The clock signal CK is generated ni times in the block BLi. Therefore, the block BLi corresponds to Mi·ni position control clock signals. The frequency-dividing ratio changes by $n_i \cdot \Delta N$ while the block BLi is being optically scanned.

The block number K and the values of Mi, ni are selected so that the frequency fk of the image scanning clock signal generated by the voltage-controlled oscillator 62 will well approximate an ideal frequency change arising from the variation of the scanning rate. The block number K and the values of Mi, ni are determined experimentally or theoretically according to design conditions for the optical scanning apparatus.

FIG. 7 shows, by way of example, an ideal pattern in which the image scanning clock frequency $fk_0$ varies and a step-like or staircase pattern in which a clock frequency $fk_1 = (M/N) \cdot f_0$ varies by successively changing the frequency-dividing ratio (It is assumed that a rotating light beam deflector in the form of a special polygonal mirror proposed in Japanese Patent Application No. 59(1984)-274324 is employed. In this polygonal mirror, the deflection angle $\theta$ for a light beam applied is given by $\sin \theta = 1 - (A/R) \sin \alpha$ where $\alpha$ is the angle of rotation of the mirror, and A, R are constants according to the configuration of the polygonal mirror). The numerals 5, 6, 10, 16 below the step-like curve $fk_1$ correspond to M1, M2, M3, M4 with the righthand end of the graph being a scanning starting end. It will be noted that $n1 = 6$, $n2 = 9$, $n3 = 3$, $n4 = 5$. The graph only shows a righthand half of a symmetric step-like pattern, and the block number K is 7, $M5 = 10$, $n5 = 3$, $M6 = 6$, $n6 = 9$, $M7 = 5$, $n7 = 6$. The width $\Delta N$ for changing the frequency-dividing ration N is 1. As the frequency-dividing ratio is successively changed, the image scanning clock frequency is continuously varied to well approximate the ideal pattern in which the frequency $fk_0$ is changed. The frequency-dividing ratio N is 69 at the opposite ends of the scanned area and 89 at the center thereof.

Turning back to FIG. 2, the generation of the correction signal will be described. At the same time that the signals EN, CK, U/D generated by the control circuit 50 are applied to the counter 52, they are also applied to an up/down counter 68. Therefore, the counters 68, 52 are simultaneously enabled to count the clock pulses and are also simultaneously switched between the up- and down-count modes. The counter 68 is driven to count the clock pulses each time the frequency-dividing ratio for the reference clock signal from the oscillator 54 is changed in the image scanning clock frequency control circuit, and issues a digital signal that changes in a step-like manner, according to the count. This digital signal serves as the correction signal.

Figure 5:
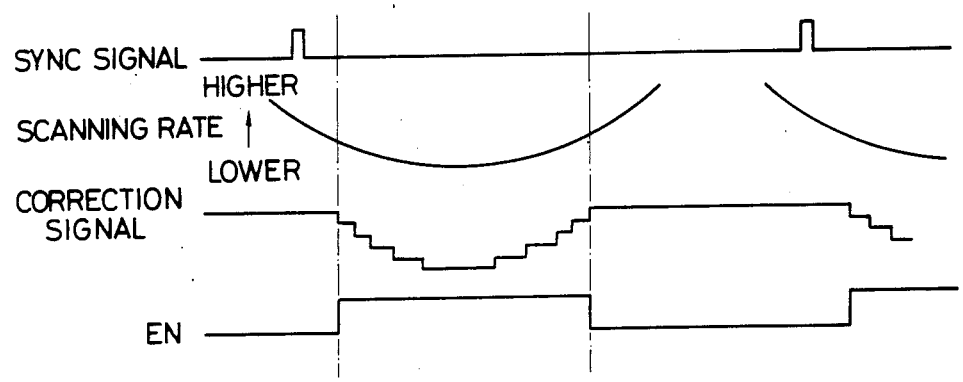
FIG. 5 is a diagram explanatory of the relationship between a scanning rate and a correction signal.

Inasmuch as the counters 52, 68 simultaneously switch between the up- and down-count modes, the correction signal is larger for a higher scanning rate and smaller for a lower scanning rate, as shown in in FIG. 5. The reference signal is modulated by the correction signal.

The correction signal and the reference signal are applied to the arithmetic means 42.

Figure 4A:
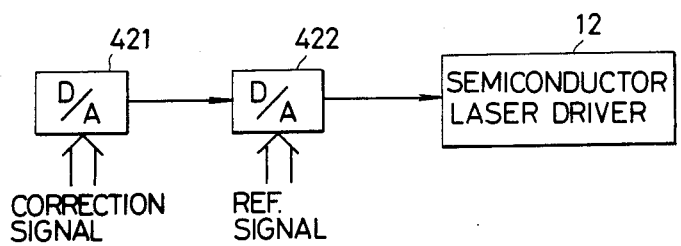
FIGS. 4A and 4B are block diagrams of two different arithmetic means.
Figure 4B:
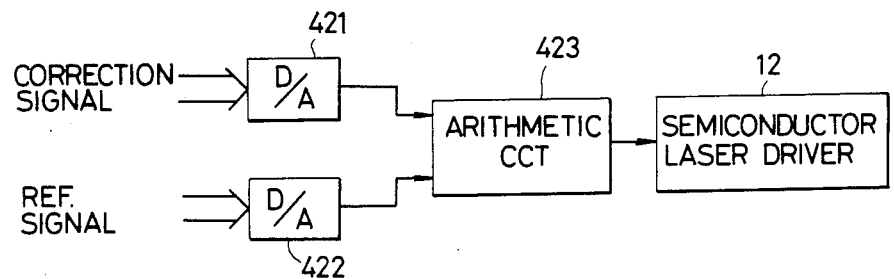

FIGS. 4A and 4B show two fundamental circuit arrangements for the arithmetic means 42. The circuit arrangement of FIG. 4A is of a multiplication type. The reference signal and the correction signal are applied respectively to D/A converters 422, 421 by which they are converted to analog signals. The correction signal is converted by the D/A converter 421 to an analog signal which is then applied to the D/A converter 422. The analog signal converted from the reference signal by the D/A converter 422 is multiplied by the analog signal applied by the D/A converter 421. Since the correction signal is proportional to the scanning rate as shown in FIG. 5, the analog signal issued from the D/A converter 422 varies in a step-like manner in proportion to the scanning rate. By modulating the analog signal from the D/A converter 422 with the modulating signal and driving the semiconductor laser 10 with the modulated signal, the intensity of the laser beam emitted from the semiconductor laser 10 is larger for a higher scanning rate, and smaller for a lower scanning rate. The laser beam intensity varies in a steplike manner. As a result, irregularties of the amount of exposure to which the photosensitive body is subjected in the scanning direction are effectively reduced.

FIG. 4B shows a general circuit arrangement for the arithmetic means 42. The reference and correction signals are converted by the D/A converters 422, 421, respectively, into analog signals, which are modulated by an analog arithmetic circuit 423 so as to produce a desired analog signal which varies in a step-like manner in proportion to the scanning rate. The arithmetic circuit 423 effects addition, multiplication (when the correction signal is proportional to the scanning rate), subtraction, or division (when the correction signal is inversely proportional to the scanning rate). A desired resolution can be obtained by varying the gain of each of the D/A converters.

Figure 3:
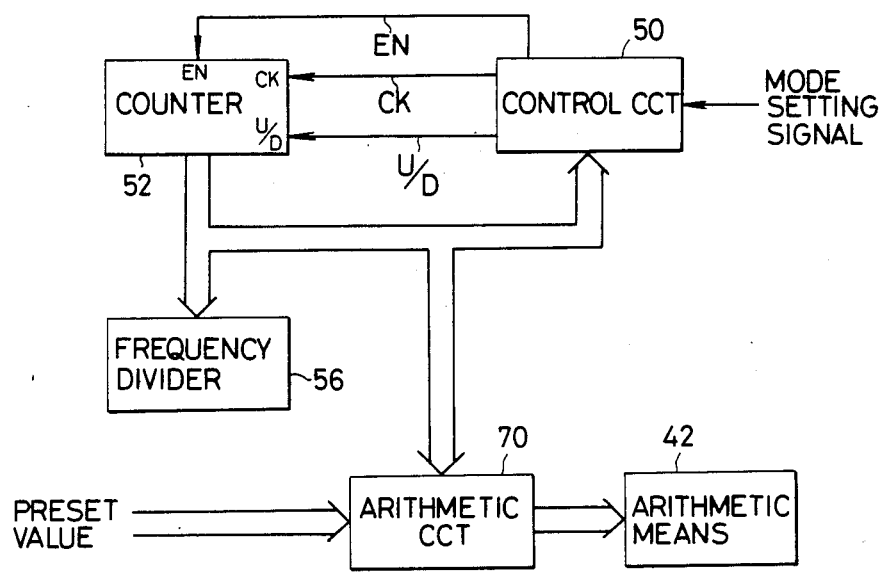
FIG. 3 is a block diagram of another circuit for generating a correction signal.

FIG. 3 illustrates another circuit arrangement for producing the correction signal. In this circuit arrangement, an output from the up/down counter 52 which is driven for successively changing the frequency-dividing ratio in a step-like manner is applied to an arithmetic circuit 70, and processed in combination with a preset value, i.e., added to or subtracted from the preset value, to produce a correction signal.

In FIGS. 2 and 3, a mode setting signal controls the digital value setting circuit 40 (FIG. 1) such that the D/A converter (D/A converter 421 in FIG. 4) for converting the correction signal will not act on the operation of the output intensity control circuit for the semiconductor laser when setting the output intensity, and also controls the up/down counter 20 such that the output from the D/A converter (D/A converter 422 in FIG. 4) for converting the reference signal will be maintained when optically scanning the photosensitive body.

According to still another embodiment shown in FIG. 8, an arithmetic circuit 42A and a D/A converter 43 are employed in place of the arithmetic means 42 (FIG. 1). The correction and reference signals from the digital value setting circuit 40 and the counter 20 are applied to the arithmetic circuit 42A, in which the reference signal is modulated by the correction signal.

Since the correction signal is proportional to the scanning rate as shown in FIG. 5, the correction signal and the reference signal are multiplied, added to each other, or subtracted from each other, to produce a digital signal that varies in a step-like fashion in proportion to the scanning rate.

This digital signal is converted by the D/A converter 43 to an analog signal which is applied to the semiconductor laser driver 12, by which the signal is modulated by a modulating signal to drive the semiconductor laser 10. In an area scanned by the laser beam from the semiconductor laser 10, the intensity of the laser beam is larger for a higher scanning rate and smaller for a lower scanning rate. The laser beam intensity varies in a steplike manner. Accordingly, irregularities of the amount of exposure to which the photosensitive body is subjected in the scanning direction are effectively reduced.

When the laser beam intensity is set to a reference level, or during output intensity control, the output from the digital value setting control circuit 40 does affect the arithmetic operation in the arithmetic circuit 42A. Therefore, during output intensity control, the arithmetic circuit 42A serves as a multiplier for multiplying the output of the up/down counter 20 by the factor of 1.

Figure 9:
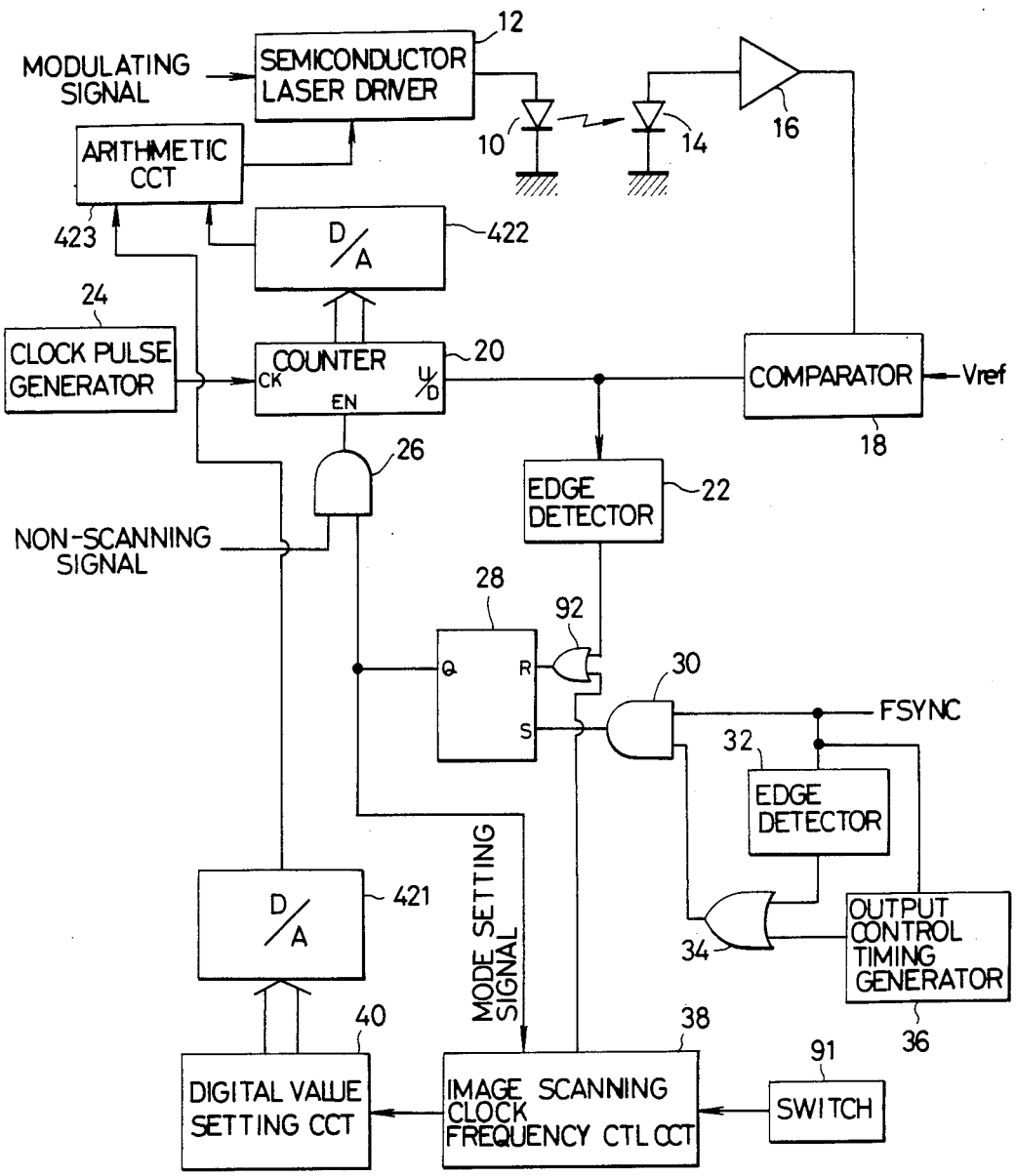

FIG. 9 shows a still further embodiment of the present invention. The circuit arrangement of FIG. 9 is similar to that of FIG. 8, but additionally includes a switch 91, an OR gate 92, and D/A converters 421, 422. The control circuit in the image scanning clock signal control circuit 38 controls the digital value setting circuit 40 with an output signal from the flip-flop 28 such that when setting the power of the semiconductor laser 10, an output from the D/A converter 421 does not act on the semiconductor laser driver 12. When not setting the power of the semiconductor laser 10, an output from the D/A converter 422 is maintained to allow the current which drives the semiconductor laser 10 to vary with the scanning rate. The output intensity of the semiconductor laser 10 is controlled at a constant value by setting the power of the semiconductor laser 10, and can be adjusted by varying the reference signal Vref. If the output intensity of the semiconductor laser 10 varies properly according to the output from the digital value setting circuit 40, exposure irregularities due to varying scanning rates are eliminated. In operation, the operator turns on the switch 91 to select a mode for modulating the output intensity of the semiconductor laser 10, and a drive current dependent on a value calculated by an arithmetic circuit 423 from the analog output from the D/A converter 421 and an analog output from the D/A converter 422 dependent on the count held by the counter 20 is passed by the semiconductor laser driver 12 through the semiconductor laser 10. The output intensity of the semiconductor laser 10 thus driven is measured by a power meter, and the gain of the D/A converter 421 is varied to optimize the maximum value of changes (i.e., a minimum output intensity) in the output intensity of the semiconductor laser 10 which is brought about by the output of the digital value-setting circuit 40. The control circuit in the image scanning clock signal control circuit 38 forcibly resets the flip-flop 28 through the OR gate 92 in response to a turn-on signal from the switch 91, for thereby disabling the counter 20. Thus, the count of the counter 20 is maintained, and the output intensity of the semiconductor laser 10 is lowered from the intensity corresponding to the maintained count according to the output of the digital value setting circuit 40.

Rather than adjusting the gain of the D/A converter 421, an amplifier may be connected to the output terminal of the D/A converter 421, and the gain of the amplifier may be adjusted to optimize changes in the output intensity of the semiconductor laser 10.

Although certain preferred embodiments have been shown and described, it should be understood that many changes and modifications may be made therein without departing from the scope of the appended claims.

We claim:

1. A method of optically scanning a surface, comprising the steps of:

deflecting a modulated laser beam with a light beam deflector to scan scanning lines on said surface without use of an f$\theta$ lens;

generating a digital reference signal for an output intensity control circuit to set the intensity of the laser beam to a reference level for scanning;

generating an image scanning clock signal having a frequency which varies within a scanning line in accordance with the position of the beam along the scanning line;

generating a digital correction signal which varies with variations in the frequency of said image scanning clock signal;

generating an analog signal which varies in a step-like manner within a scanning line by modulating said reference signal with said correction signal; and modulating said analog signal with a modulating signal and using the resulting modulated analog signal to modulate said scanning beam.

2. A method according to claim 1, wherein a reference clock signal is generated by an oscillator and frequency-divided by frequency-divider means, and the frequency-divided signal is processed through a phase-locked loop to thereby become said image scanning clock signal, said frequency-divider means having frequency-dividing ratios selectable to change the frequency of said image scanning clock signal according to the position of said laser beam along a scanning line.

3. A method according to claim 1, wherein said analog signal is generated by an arithmetic means which effects an arithmetic operation on said reference signal and said correction signal to thereby produce said analog signal.

4. A method according to claim 1, wherein an arithmetic means converts said reference signal and said correction signal to respective analog signals, and effects an arithmetic operation on said analog signals to thereby produce said analog signal which varies in step-like manner along a scanning line.

5. A method according to claim 1, wherein the resolution of said correction signal is adjusted by adjusting means to thereby achieve a desired resolution level of the correction signal and a corresponding resolution in changes in the output intensity of said laser.

6. A method according to claim 5, wherein the resolution of said correction signal is adjusted by adjusting the gain of a digital-to-analog converter which converts said correction signal to an analog signal.

7. A method according to claim 5, wherein the resolution of said correction signal is adjusted by adjusting the gain of an amplifier which amplifies said correction signal.

8. A method of scanning a surface with a laser beam comprising the steps of:

causing a laser beam to scan scanlines along a surface such that the beam moves faster toward the ends of a scanline than toward the middle of the scanline;

generating a digital reference signal as a function of comparing a characteristic of the laser beam with a reference value at times when the laser beam is not scanning a scanline;

generating a scanning clock which has a higher frequency when the beam is toward the ends of a scanline than when the beam is toward the middle of the scanline;

generating a digital correction signal which varies with the position of the beam along a scanline;

generating an analog signal which varies in a step-like manner as a function of a modulation of said reference signal with said digital correction signal, wherein each of at least a plurality of the steps of said analog signal corresponds to a plurality of clock cycles of said scanning clock, to thereby cause the beam to have higher intensity toward the ends of a scanline than toward the middle of the scanline; and modulating said analog signal with an information signal to thereby generate a laser driving signal and driving the laser with said laser driving signal.

* * * * *